Aug. 7, 1951 — E. A. FONTAINE — 2,563,780
OPTICAL ALIGNING DEVICE
Filed March 7, 1950 — 2 Sheets-Sheet 1

EMILE A. FONTAINE
INVENTOR

Aug. 7, 1951      E. A. FONTAINE      2,563,780
OPTICAL ALIGNING DEVICE
Filed March 7, 1950      2 Sheets—Sheet 2
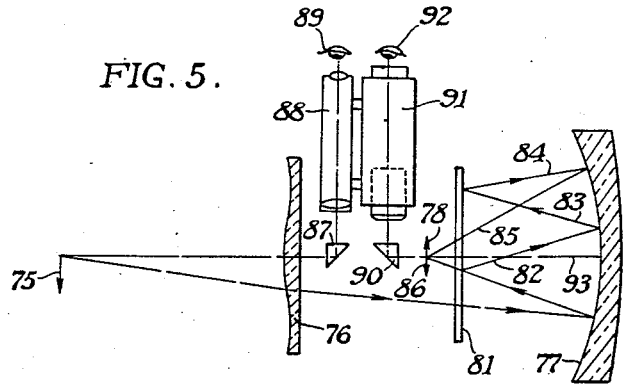
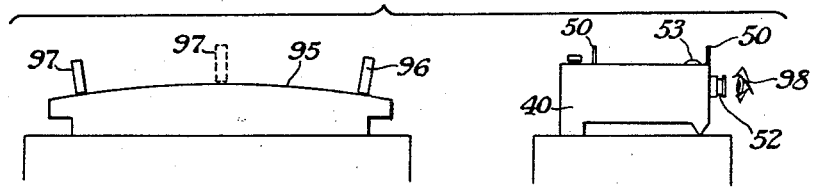
EMILE A. FONTAINE
*INVENTOR*
BY Daniel J. Mayne
F. M. Emerson Holmes
*ATTORNEYS*

Patented Aug. 7, 1951

2,563,780

UNITED STATES PATENT OFFICE 2,563,780

OPTICAL ALIGNING DEVICE

Emile A. Fontaine, Gethsemane, Ky., assignor to Eastman Kodak Company, Rochester, N. Y., a corporation of New Jersey Application March 7, 1950, Serial No. 148,236

3 Claims. (Cl. 88—14)

This invention relates to optical aligners which are instruments for the accurate determination of a straight line.

It is an object of the invention to provide an optical aligner of simple construction but extreme accuracy.

It is also an object of the invention to provide such an instrument which does not require any reticle mark and which does not easily get out of adjustment.

According to the invention an optical aligner is made up of an objective, which may be a concave mirror but which is preferably a positive lens, for forming an image of a test object which may be in any form and may include a scale. Semi-transparent plane reflectors are provided in both focal planes of the objective. In the case of a concave reflector, the two focal planes are coincident and hence a single mirror is used as the semi-transparent reflecting means. In the case of a positive lens, two separate semi-transparent mirrors are used, one in the front focal plane and the other in the rear focal plane immediately in front of the above mentioned image. This combination of semi-reflecting means and objective causes the formation of a second image superimposed on the first, but inverted relative thereto. An optical system such as a microscope is provided for viewing the superimposed images. The optic axis of the objective is perpendicular to both of the plane mirrors in the positive lens embodiment and is perpendicular to the one mirror which constitutes both semi-reflecting means in the case of the concave mirror embodiment. The optic axis is the aligning axis of the instrument.

Although it is not essential to the invention, it is sometimes desirable to provide light deviating means to permit fine adjustment of the instrument. This may conveniently take the form of a tilting plate or rotatable wedges somewhere in the optical beam, but any of the light deviating devices commonly used in range finders are satisfactory. Other advantages of the invention will be apparent from the following description when read in connection with the accompanying drawing in which:

Fig. 5 illustrates the optical system for another embodiment of the invention.

Fig. 6 illustrates schematically the operation of the aligner.

Figure 1:
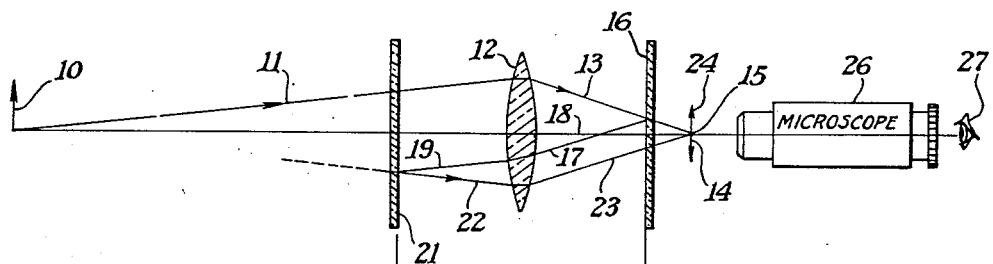
Fig. 1 is a schematic view of a simple optical system incorporating the invention.

In Fig. 1 light from an object 10 as indicated by a light ray 11 is refracted by a positive lens 12 to form an image 14 at the point 15 on the optic axis of the objective. According to the invention, a semi-transparent reflector 16 positioned in the back focal plane of the objective 12 reflects part of the light as indicated by the ray 17 back toward the lens 12 which again refracts it to form ray 19. A second semi-transparent reflector 21 located in the front focal plane of the objective 12 reflects this light as indicated by ray 22 as if it were coming from the same point on the object 10 as does the ray 11. This ray 22 is again refracted by the lens 12, as indicated by the ray 23 to form a second image 24 at the point 14. This second image is inverted relative to the image 14 and is not as bright as the image 14. Incidentally any of the ray 23 reflected at the surface 16 can make a similar trip through the lens twice to reinforce the image 14.

Figure 2:
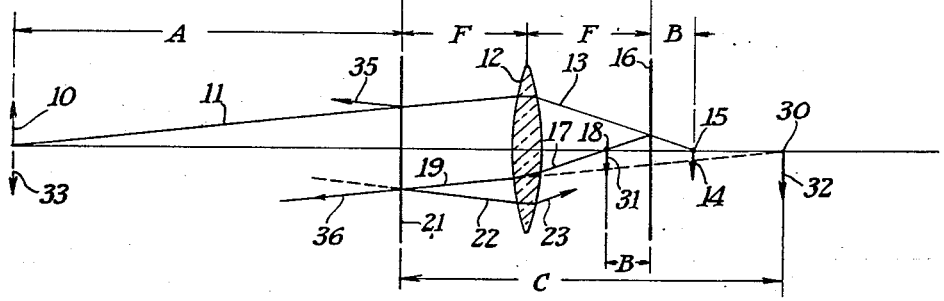
Fig. 2 is a diagram illustrating the operation of Fig. 1.

Reference to Fig. 2 will illustrate why the image 24 is superimposed on the image 14 rather than being formed somewhere else. The distances from the object 10 to the focal plane 21 and from the focal plane 16 to the image 14 are labeled A and B in Fig. 2. By simple optical principles $A.B = F^2$. When the ray 13 is reflected at the mirror 16, it crosses the optic axis at the point 18 whose distance from the focal plane 16 is also B, or more precisely is minus B. The ray 17 traveling from the point 18 to the lens 12 is refracted by the lens so that the ray 19 appears to come from a point 30. That is, the lens 12 forms a virtual image 32 of the real image 31 which is formed at the point 18 by light reflected by the mirror 16.

Since the object 31 is at a distance minus B from the focal plane 16, the virtual image 32 must be at a distance minus C from the focal plane 21 where $C = A$. This is true because both of the following relationships hold.

With respect to object 10 and image 14, $A.B = F^2$. With respect to object 31 and image 32, $C.B = F^2$. Thus $C = A$.

The reflector 21 receiving the ray 19, apparently from the image 32 reflects it as if it came from a virtual image 33 at the same distance from the mirror 21 as is the image 32. Thus the virtual image 33 is located at the same point as the original object 10. Thus it is that ray 22 appears to come from the object 10 and hence when refracted by the lens 12 it will come to focus once again at the point 15. However, the virtual image 33 is inverted relative to the object 10 and hence the second image 24 formed at the point 15 is inverted relative to the first image 14.

The superimposed images thus formed are viewed through a microscope 26 by the eye 27 of an observer.

Figure 3:
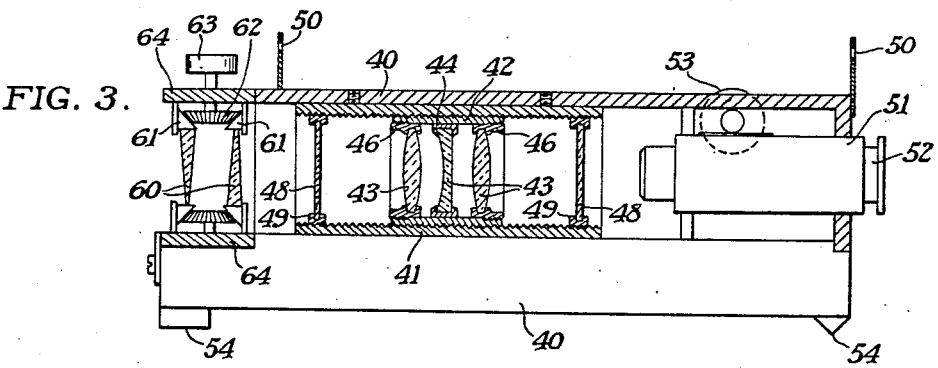
Fig. 3 is a side elevation, partly in section of an optical aligner according to the invention.

In Fig. 3 the housing 40 of an optical aligner includes a hollow cylinder in which a lens mount 41 is held by suitable set screws. This lens mount 41 includes an internal thread into which a lens rim 42 is screwed carrying lens elements 43 which constitute a 3-piece telescope objective covering only a relatively narrow field. However the specific coverage is not a critical part of the invention, nor is the particular type of positive lens. In Fig. 3 the lens elements 43 are cup centered by spacing rings 44 and clamping rings 46 which concentrically engage the refractive surfaces of the elements. At each end of the lens mount 41, a glass plate 48 is mounted in screw rings 49 which permit adjustment of the distance of the plates 48 from the lens system. The inner surfaces of the plates 48 are provided with semi-reflecting surfaces in the manner common to beam splitters. The outer surfaces of these plates and the surfaces of the lens elements are preferably provided with reflection reducing coatings such as magnesium fluoride, one quarter wave length thick. During manufacture the lens is first mounted near the center of the lens mount 41 and then the plates 48 are inserted and adjusted until the semi-reflecting surfaces are accurately in the focal planes of the lens.

The images formed by this system are viewed by a microscope 51 provided with an adjustable eyepiece 52 and focused in the usual manner by a focusing knob 53. The whole instrument is provided with three-point suspension on studs, two of which are indicated at 54, and which are preferably glass or Carboloy lapped to flatness or to a knife edge.

Preliminary aiming of the device is provided in this embodiment by a simple gunsight consisting of fiducial marks 50 which are lined up with the target as in aiming a gun. Low power telescopic gunsights will also serve for preliminary aiming.

Since it is sometimes desirable to make a fine adjustment after the preliminary aiming without moving the whole instrument, a light deviating means is provided, consisting of two wedges 60, which rotate about the optic axis of the system in opposite directions. The wedges are carried in bevel gears 61 which engage a small bevel gear 62 which in turn is adjustable by means of a knob 63 on the outside of the instrument. The whole mount 64 is also rotatable in the housing 40 to permit the fine adjustment to be made in any azimuth. Any light deviating device of the types used in rangefinders, is suitable for this purpose, such, for example, as the tilting plate shown in my co-filed application Serial No. 148,237.

Figure 4:
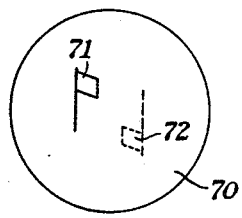
Fig. 4 shows the field of view seen through this instrument.

When one views an object through this instrument, the field of view 70 is similar to that shown in Fig. 4 in which the image 71 appears to one side of the point 73 which corresponds to the aiming or aligning axis of the instrument. A second image 72 appears on the opposite side of the point 73 and at the same distance therefrom. If the device is to point at some particular part of the object, adjustments are made until the two images of this part are in register.

In Fig. 5, a different embodiment of the invention is shown in which the objective consists of a spherical concave mirror 77. In the case of a concave mirror the two focal planes are coincident and hence only one semi-transparent mirror serves to provide both reflections required by the invention. In this figure light from the object 75, after passing through a lens element such as the Schmidt aspheric plate 76 (or a concentric meniscus element of known type) for correcting the spherical aberration of the concave mirror, is brought to focus by the concave mirror 77 to form an image 78. A semi-transparent reflector 81 positioned in the focal plane of the mirror reflects part of this beam to form a ray 82 which is again reflected by the mirror 77 to form ray 83 and then reflected a second time at the plane mirror 81 to form a ray 84 apparently coming from the same point of the object 75. This ray 84 is then reflected a third time by the mirror 77 as indicated by ray 85 to form a second image 86 superimposed on, and inverted relative to, the image 78.

While the Schmidt plate 76 and the mirror 77 may be said to have an optic axis, the factor which precisely defines the optic axis of this instrument is the orientation of the mirror 81 relative to the concave surface 77. As shown in the drawing, the optic axis is constituted by the line which passes between the point of the mirror 81 which is at the greatest perpendicular distance from the sphere represented by the surface 77. This line passes through the focal point of the mirror 77 and is perpendicular to the mirror 81. It is thus a very precisely defined optic axis. This point does not come up in the case of a positive lens since the optic axis of the latter is always well defined whereas a concave spherical mirror does not have a precise optic axis until it is combined with some other element. However, the surface 81 must be orthogonal to the optic axis, whatever system is used. A small prism 90 reflects the light from the images 78 and 86 into a microscope 91 for viewing by the eye 92 of an observer.

In this embodiment, preliminary aiming is conveniently provided by a small prism 87 which reflects light directly from the object to a low power wide field telescope 88, the eye of the observer being held at 89 for such aiming.

In Fig. 6, the aligner shown in Fig. 3, is used for testing the flatness of a long surface 95. To do this, a target 96 which may be a unit associated with the surface 95 such as a carriage riding on a track or which may be a special target placed on the surface 95 just for the alignment test, is examined by an observer (whose eye is at 98) through the aligner 40. The aligner and target are adjusted relative to one another until in perfect alignment. The target is then moved to different positions indicated at 97 and the discrepancy from perfect alignment is noted. The curvature of the surface 95 is greatly exaggerated in the picture, but in practice the aligner is used to pick up variation of a thousandth of an inch in tracks supposedly flat for twenty feet or more.

The invention is not limited to these embodiments but is of the scope of the appended claims.

I claim:

1. An optical aligner comprising an objective for forming an image of a test object, plane semi-reflecting means in the focal planes of the objective orthogonal to the optic axis of the objective whereby a second image is formed superimposed on and inverted relative to the first and means for viewing the superimposed images.

2. An optical aligner comprising a positive lens for forming an image of a test object, two semi-transparent plane reflectors orthogonal to the optic axis of the lens system and respectively in the front and rear focal planes of the lens system for forming in cooperation with the lens system a second image superimposed on and inverted relative to the first image, and means for viewing the superimposed images.

3. An optical aligner according to claim 2 including light deviating means aligned with the lens system to permit fine adjustment of the alignment.

EMILE A. FONTAINE.

REFERENCES CITED

The following references are of record in the file of this patent:

UNITED STATES PATENTS

| Number | Name | Date |
|---|---|---|
| 1,199,307 | Risley | Sept. 26, 1916 |
| 2,395,605 | Young | Feb. 26, 1946 |

FOREIGN PATENTS

| Number | Country | Date |
|---|---|---|
| 269,447 | Germany | Jan. 22, 1914 |
| 64,842 | Austria | May 11, 1914 |
| 360,996 | Germany | Oct. 9, 1922 |